United States Patent [19]

Wysocki

[11] 3,933,694

[45] Jan. 20, 1976

[54] LOW SMOKE-OUTPUT POLYURETHANE AND POLYISOCYANURATE FOAMS

[75] Inventor: Donald C. Wysocki, Pittsburgh, Pa.

[73] Assignee: Owens-Corning Fiberglas Corporation, Toledo, Ohio

[22] Filed: July 10, 1974

[21] Appl. No.: 487,416

[52] U.S. Cl. .................... 260/2.5 AW; 260/2.5 A
[51] Int. Cl.² ......................................... C08G 18/14
[58] Field of Search .. 260/2.5 AW, 2.5 BB, 2.5 AV, 260/2.5 AL, 2.5 AB, 45.85 N, 2.5 A, 2.5 AM

[56] References Cited

UNITED STATES PATENTS

| | | | |
|---|---|---|---|
| 2,894,919 | 7/1959 | Simon et al. | 260/2.5 AV |
| 3,071,554 | 1/1963 | Scott et al. | 260/2.5 AW |
| 3,158,529 | 11/1964 | Robitschek et al. | 260/2.5 AV |
| 3,331,792 | 7/1967 | O'Shea | 260/2.5 BB |
| 3,531,433 | 9/1970 | Elmer | 260/2.5 BB |
| 3,542,704 | 11/1970 | Radcliff et al. | 260/2.5 AL |
| 3,715,337 | 2/1973 | Allen et al. | 260/2.5 AW |

FOREIGN PATENTS OR APPLICATIONS

| | | | |
|---|---|---|---|
| 1,134,268 | 11/1968 | United Kingdom | 260/2.5 BB |

OTHER PUBLICATIONS

Reid–Organic Chemistry of Bivalent Sulfur, Chemical Publishing, (New York) 1960; Vol. II, pp. 248–249; Vol. III, pp. 387–393.

Hackli's Chemical Dictionary, 3rd Ed. McGraw-Hill (1953) pp. 817 and 850.

Phillips Petroleum Co. 6th Ed. Bulletin 522 (1964) p. 172.

Lenz–Organic Chemistry of Synthetic High Polymers, Interscience (1967) p. 154.

Aldrich Handbook of Organic Chemicals, Aldrich Chemical Co. (1972) p. 309.

*Primary Examiner*—H. S. Cockeram
*Attorney, Agent, or Firm*—Carl G. Staelin; John W. Overman; Patrick P. Pacella

[57] ABSTRACT

Polyurethane and polyisocyanurate-urethane foams are disclosed. Organosulfur compounds are added to the foams to reduce their smoking under fire conditions.

4 Claims, No Drawings

LOW SMOKE-OUTPUT POLYURETHANE AND POLYISOCYANURATE FOAMS

This invention relates to plastic foams.

Plastic foams such as polyurethane foams and polyisocyanurate urethane foams have found widespread utility in the fields of insulation and structural reinforcement. One factor limiting the commercial utilization of plastic foams has been their flammability when exposed to flame or high temperature. Another factor to be considered is the amount of smoke generated by the foams under fire conditions. Modifications to control these properties are known in the art. For example, U.S. Pat. No. 3,542,701 discloses the use of elementary sulfur as a flame-retardant in some plastic foams. U.S. patent application Ser. No. 371,324, filed June 18, 1973, now U.S. Pat. No. 3,876,568, discloses the addition of elementary sulfur to polyisocyanurate-urethane foams to lower smoke output.

I have discovered that the addition of certain organosulfur compounds to polyurethane or polyisocyanurate-urethane foams reduces their smoking under fire conditions. This reduction is achieved without adversely affecting the flame retardancy of the foams.

Accordingly, an object of this invention is to provide plastic foams with reduced smoke output under fire conditions.

One skilled in the art will see other objects, aspects and advantages of this invention in the following disclosure and appended claims.

The organosulfur compounds of this invention are organic sulfides, polysulfides, sulfoxides, sulfones, thiocarbonates and the like. These organosulfur compounds are represented by the formulas:

$R_2S_x$  $CS(OR)_2$
$R_2SO$  $CO(SR)OR$
$R_2SO_2$  $CO(SR)_2$
  $CS(SR)OR$
  $CS(SR)_2$ wherein each R is hydrogen alkyl, alkoxy, cycloalkyl, cycloalkoxy, or aryl having 1 to 20 carbon atoms, at least one R is alkyl, alkoxy, cycloalkyl, cycloalkoxy or aryl and X is an integer from 1 to 10. Preferably each R is hydrogen, alkyl or aryl. Preferably each R has from 1 to 12 carbon atoms and $x$ is an integer from 1 to 6. The sulfides are binary compounds of divalent sulfur. Oxidation of the sulfides produces sulfoxides, then sulfones. The oxidation of mercaptans produces the disulfides. We derive the thiocarbonates from carbonic acid by the substitution of one or more of its oxygen atoms with sulfur.

The amount of organosulfur compound in the foams ranges from 0.5 to 25.0% by weight of foam. And preferably ranges from 5.0 to 15.0%.

The term "isocyanurate" or "polyisocyanurate" refers to a composition having isocyanurate rings in its structure. These rings are generally depicted as:

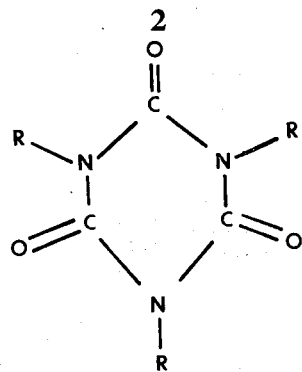

and are produced by the following equation:

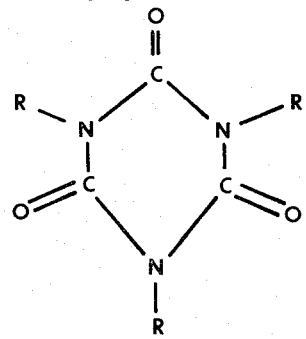
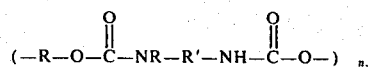

The art recognizes that the trimerization or polymerization of organic isocyanates having the formula RNCO, urethane prepolymers having reactive —NCO groups, or other materials having reactive —NCO groups attached thereto, for example, polyamide prepolymers, or combinations of these compounds, in the presence of a suitable catalytic agent and preferably one or more polyols will yield polymers referred to as isocyanurates, isocyanurate-urethanes or, for example, isocyanurate-amides or isocyanurate-urethane-amides. The isocyanurate ring structure is present in all of these compounds.

Urethanes or polyurethanes can be formed by a variety of methods. The most widely used production method is the reaction of di- or polyfunctional hydroxy compounds, for example hydroxyl terminated polyesters or polyethers, with di- or polyfunctional isocyanates. The general structure of a linear polyurethane derived from a dihydroxy compound, HOROH, and a diisocyanate, OCNR'NCO, is represented by the following general formula:

$$(-R-O-\overset{O}{\underset{\|}{C}}-NR-R'-NH-\overset{O}{\underset{\|}{C}}-O-)_n.$$

In the polyisocyanurate-polyurethane compositions there is a combination of isocyanurate and urethane linkages or structure. Of the total isocyanate used in these compositions some of it is trimerized or polymerized to form isocyanurate rings and some of it is reacted with one or more polyols to form urethane linkages. These compositions are formed by controlling the NCO/OH ratio of the isocyanate and polyol reactants so that a certain percentage of the total available isocyanate can react with the polyol to form urethane structure and the remainder of the isocyanate can trimerize to form isocyanurate structure. Generally, the NCO/OH ratio is maintained between about 4 to 1 and 50 to 1 and the isocyanurate-urethane plastic foams so produced are about 5 to 25% urethane and 75 to 95% isocyanurate. The NCO/OH index is determined by using the formula:

$$\text{NCO/OH index} = \frac{\text{hydroxyl equivalent of isocyanate} \times \text{weight of isocyanate used}}{\text{hydroxyl number of polyol} \times \text{weight of polyol used}}$$

Rigid, low density foams can be prepared by reacting polyols with polyisocyanates in the presence of a suitable catalyst, a blowing agent, and generally a surfactant. This invention works well for both the one-shot technique and the pre-polymer approach.

The foaming operation is effected by means of incorporating the blowing agent in the foam forming constituents. It can be water or a low boiling, inert liquid, which vaporizes below the temperature of the foaming mass. The preferred blowing agents are certain halogen-substituted aliphatic hydrocarbons. In foams intended for use as insulation the incorporation of a gas lowers the foam's heat conductivity and results in obtaining a better K-factor. All of these methods are known in the art.

Preferred blowing agents are fluorocarbons such as trichloromonofluoromethane, dichlorofluoromethane and the like. The weight of blowing agents used is varied depending on the foam density desired.

Catalysts which are conventional for the trimerization of isocyanate groups may be used in the present invention. Some examples are described in the literature, such as Saunders, J. R. Frisch, K. C. "Polyurethanes, Chemistry and Technology," Part 1, pgs. 94–97 and 212; Beitchmann, B. D. "Rubber Age," February 1966; Beitchmann, B. D. *I j EC Product Research and Development*, Vol. 5, No. 1, pages 35–41, March 1966; and Nicolas, L. and Gmitter, G. T., *J. Cellular Plastics*, Vol. 1, No. 1, pgs. 85–95 (1965).

Examples of these trimerization catalysts are (a) organic strong bases or salts thereof, (b) tertiary amine cocatalyst combinations, (c) alkali metal oxides, alkali metal alcoholates, alkali metal phenolates, alkali metal hydroxides and alkali metal carbonates, (f) onium compounds from nitrogen, phosphorous, arsenic, antimony, sulfur and selenium, (g) epoxides and (h) non-substituted monocarbamic esters. Preferred catalysts are those which are soluble in other components of the formulation including for example, polyether polyols and fluorocarbons.

Conventional catalysts for the production of linear polyurethanes included are tertiary amines such as triethylenediamine. Other commonly employed catalysts are triethylamine and dimethylethanolamine, as well as tin, lead, and cobalt containing compounds.

When producing urethane foams, a surfactant is used which serves to regulate rigid foam cell size. Frequently used surfactants are high molecular weight, liquid silicones. The weight of surfactant generally is between 0.5 and 1.5% by weight of the polyol.

Generally, the polyol, catalyst, blowing agent and surfactant are admixed. The isocyanate and organo sulfur compound are mixed and then added to the polyol mixture. If desired, the isocyanate and organo sulfur compound can be added to the polyol mixture separately with the isocyanate being added last.

The advantages of this invention further are illustrated by the following examples. The reactants, proportions and other specific conditions are presented as being typical and should not be construed to limit the invention unduly.

EXAMPLE I

| Ingredients | Parts by Weight (Control) | |
|---|---|---|
| | Run 1 | Run 2 |
| Prepolymer-polyphenyl polymethylene polyisocyanate and a neutral phosphorus polyol | 112 | 112 |
| Surfactant-silicone glycol copolymers with direct silicone carbon bonds | 1 | 1 |
| Trimerization Catalyst - dimethylaminomethyl phenol | 10 | 10 |
| Blowing agent-trichlorofluoromethane | 20 | 21 |
| ethylene trithiocarbonate | — | 10 |
| Density, pcf | 2.0 | 2.2 |
| Small tunnel smoke output | 110 | 70 |
| Small tunnel flame spread | 23 | 27 |

These foams were prepared by adding the surfactant, catalyst and blowing agent to the prepolymer, and then adding the ethylene trithiocarbonate. I blended the trithiocarbonate with the prepolymer first for Run 2. The mixture was stirred until creaming commenced and then quickly poured into a mold and allowed to rise. Each sample was cured at room temperature for at least 2 weeks prior to testing.

Substantially identical polyisocyanurate-urethane foams are compared in Runs 1 (control) and 2. The only significant differences is the inclusion of ethylene trithiocarbonate in Run 2. This addition reduced the smoke output when the foam was fire-tested by 36%. This reduction in smoke output was achieved without adversely affecting the flame retardency of the foams.

EXAMPLE II

I carried out two additional runs according to the procedures of Example I. The only difference was the use of ditertiary butyl polysulfide in place of the ethylene trithiocarbonate. The results were as follows.

| | Run 3 (control) | Run 4 |
|---|---|---|
| Density, pcf | 2.00 | 1.98 |
| Small Tunnel Smoke Output | 110 | 70 |
| Small Tunnel Flame Spread | 23 | 30 |

The use of ditertiary butyl polysulfide lowered smoke output when the foam was fire-tested by 36%. This reduction was achieved without adversely affecting the flame retardency of the foams.

Although I have described this invention in considerable detail, it must be understood that such detail is for the purposes of illustration only. One skilled in the art can make many variations and modifications without departing from the scope and spirit of this invention.

I claim:

1. A low smoke output, polyurethane or polyisocyanurate-urethane foam composition formed by reacting, in an NCO/OH ratio of from 1/1 to 50/1, one or more compounds having reactive —NCO groups with one or more polyols having reactive —OH groups; the foam composition containing 0.5 to 25.0% of at least one organosulfur compound, based on the weight of foam composition wherein the organosulfur compound is a sulfide or a thiocarbonate.

2. A foam composition according to claim 1 wherein the percent of organosulfur compound ranges from 5.0 to 10.0.

3. A foam composition according to claim 1 wherein the organosulfur compound is ditertiary butyl polysulfide.

4. A foam composition according to claim 1 wherein the organosulfur compound is ethylene trithiocarbonate.

* * * * *